(12) United States Patent
Saario et al.

(10) Patent No.: US 10,351,255 B2
(45) Date of Patent: Jul. 16, 2019

(54) DIGITAL COMMUNICATIONS BETWEEN AIRCRAFT COMPUTER AND ENGINE COMPUTER

(71) Applicant: PRATT & WHITNEY CANADA CORP., Longueuil (CA)

(72) Inventors: Teuvo Saario, Montreal (CA); Reza Pedrami, Montreal (CA); Aaron Martin, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 307 days.

(21) Appl. No.: 14/997,903

(22) Filed: Jan. 18, 2016

(65) Prior Publication Data
US 2017/0203852 A1 Jul. 20, 2017

(51) Int. Cl.
*B64D 31/14* (2006.01)
*G05B 19/414* (2006.01)
*B64D 31/06* (2006.01)
*G01C 21/20* (2006.01)

(52) U.S. Cl.
CPC .......... *B64D 31/14* (2013.01); *B64D 31/06* (2013.01); *G05B 19/4148* (2013.01); *G01C 21/206* (2013.01)

(58) Field of Classification Search
CPC ........ B64D 31/14; B64D 45/00; B64C 27/26; B64C 29/00
USPC .......................................................... 701/3
See application file for complete search history.

(56) References Cited

U.S. PATENT DOCUMENTS

| 5,416,699 | A | * | 5/1995 | DiValentin | B64C 11/305 |
|---|---|---|---|---|---|
| | | | | | 701/3 |
| 6,564,141 | B2 | | 5/2003 | Weisman, II | |
| 2003/0142725 | A1 | * | 7/2003 | Keller | H04J 13/107 |
| | | | | | 375/140 |
| 2004/0267414 | A1 | * | 12/2004 | Bartel | F02C 9/00 |
| | | | | | 701/4 |
| 2006/0042846 | A1 | * | 3/2006 | Kojori | G05B 9/03 |
| | | | | | 180/65.8 |
| 2007/0058929 | A1 | | 3/2007 | Chaffee | |

(Continued)

FOREIGN PATENT DOCUMENTS

EP 2881546 6/2015

OTHER PUBLICATIONS

Rohit Belapurkar et al: "Stability Analysis of ARINC 825-Based Partially Distributed Aircraft Engine Control with Transmission Delays and Packet Dropouts", 46th AIAA/ASME/SAE/ASEE Joint Propulsion Conference & Exhibit, Jul. 25, 2010, XP055368846, Reston, Virigina, DOI: 10.2514/6.2010-6675, ISBN: 978-1-60086-958-7.

(Continued)

*Primary Examiner* — Redhwan K Mawari
*Assistant Examiner* — Rodney P King
(74) *Attorney, Agent, or Firm* — Norton Rose Fulbright Canada LLP

(57) ABSTRACT

There are described herein methods and systems for providing an engine computer with a power request having been determined by an aircraft computer. The power request is sent over a communication bus and once it reaches the engine computer, the latency due to the different update rates of the engine computer and the aircraft computer are compensated for.

19 Claims, 9 Drawing Sheets

(56) References Cited

U.S. PATENT DOCUMENTS

2008/0267769 A1* 10/2008 Schwarz ................ F01D 11/20
    415/148
2008/0283671 A1    11/2008 Cherepinsky
2014/0032002 A1*   1/2014 Iwashima ............. G05B 13/02
    700/295
2014/0197681 A1*   7/2014 Iwashima ............... B60R 16/03
    307/9.1

OTHER PUBLICATIONS

European Patent Office, European Search Report, dated Jun. 8, 2017, 7 pages, Application No. 17152030.7.

* cited by examiner

DIGITAL COMMUNICATIONS BETWEEN AIRCRAFT COMPUTER AND ENGINE COMPUTER

TECHNICAL FIELD

The present invention relates generally to methods and systems for communicating digitally between an aircraft computer and an engine computer, and more particularly for providing the engine computer with a power request signal from the aircraft computer via a digital communication bus.

BACKGROUND OF THE ART

An aircraft engine computer, sometimes referred to as an electronic engine controller (EEC) or an electronic engine control system, may use different techniques to determine how much power should be delivered from the engine to the aircraft. In helicopters, the power required is estimated based on the Collective Lever Position (CLP). The Collective Lever refers to the collective pitch control located in the cockpit and used by the pilot to change the pitch angle of all of the main rotor blades collectively. Sensors, such as linear variable differential transformers (LVDT) or rotational variable differential transformers (RVDT) are hard-wired to the engine computer to provide sensor measurements directly to the engine computer through analog signals. Other parameters, such as airspeed and pedal position may also be used to determine the required power, and these parameters are measured with similar types of sensors that are also hard-wired to the engine computer.

There is a need to eliminate hard-wired signals in modern aircraft and thus, to find alternative solutions for determining the power needs of an aircraft.

SUMMARY

There are described herein methods and systems for providing an engine computer with a power request having been determined by an aircraft computer. The power request is sent over a communication bus and once it reaches the engine computer, the latency due to the different update rates of the engine computer and the aircraft computer are compensated for.

In accordance with a first broad aspect, there is provided a method of communicating a digital power request between an aircraft computer and an engine computer. The method comprises receiving at the engine computer, from the aircraft computer, an unadjusted power request and a power request gradient; applying a delay compensation component to the power request gradient to generate a delay compensated contribution; adding the delay compensated contribution to the unadjusted power request to obtain an adjusted power request; applying a compensation limiter to the adjusted power request to obtain a corrected power request; and outputting the corrected power request.

In accordance with another broad aspect, there is provided a system for communicating a digital power request between an aircraft computer and an engine computer. The system comprises at least one of a (a) circuit and (b) a memory and at least one processor. The memory has program code stored thereon. The at least one processor is configured for executing the program code. The circuit or memory and processor(s) are configured for receiving at the engine computer, from the aircraft computer, an unadjusted power request and a power request gradient; applying a delay compensation component to the power request gradient to generate a delay compensated contribution; adding the delay compensated contribution to the unadjusted power request to obtain an adjusted power request; applying a compensation limiter to the adjusted power request to obtain a corrected power request; and outputting the corrected power request.

In accordance with yet another broad aspect, there is provided a power request calculator. The power request calculator comprises means for receiving at the engine computer, from the aircraft computer, an unadjusted power request and a power request gradient; means for applying a delay compensation component to the power request gradient to generate a delay compensated contribution; means for adding the delay compensated contribution to the unadjusted power request to obtain an adjusted power request; means for applying a compensation limiter to the adjusted power request to obtain a corrected power request; and means for outputting the corrected power request.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
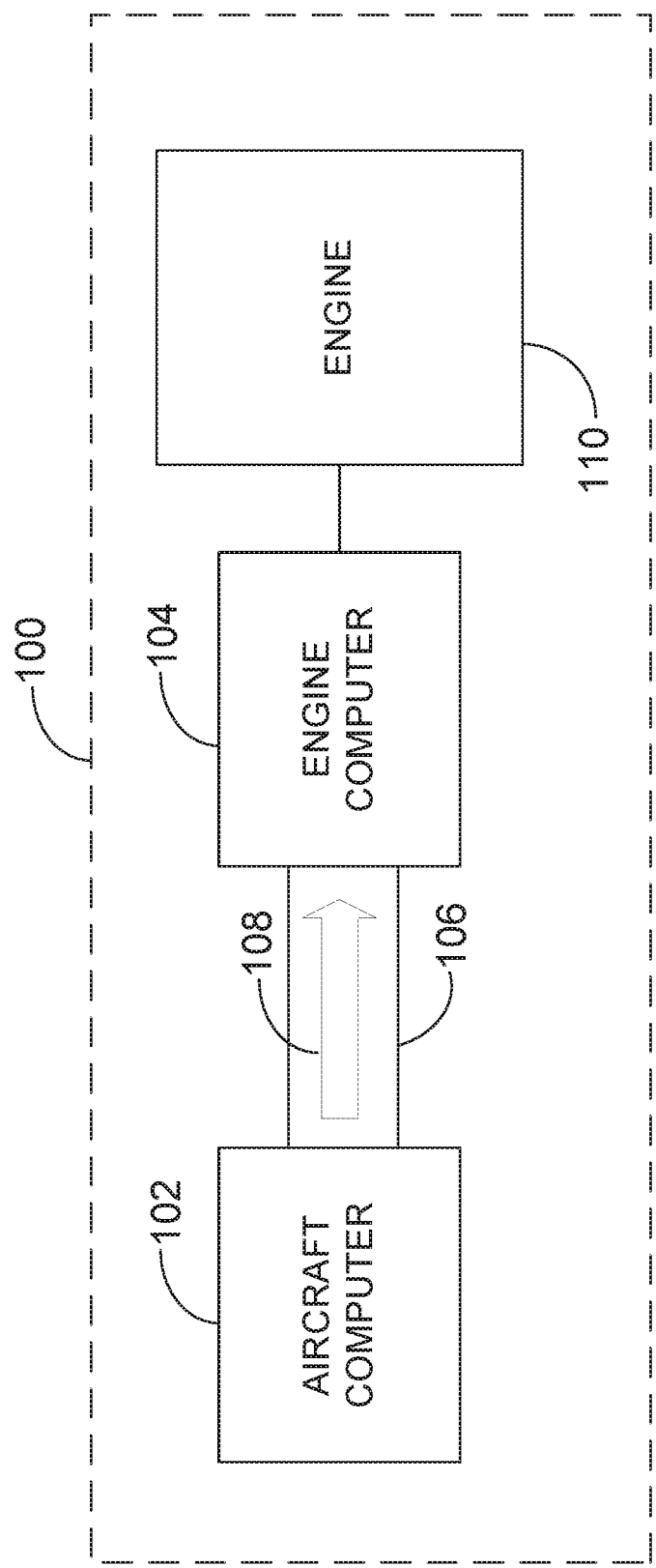
FIG. 1 is a block diagram of an aircraft having an aircraft computer an engine computer, in accordance with one embodiment.

Referring to FIG. 1, there is illustrated an aircraft 100 comprising an aircraft computer 102 and an engine computer 104. The aircraft computer 102 and engine computer 104 are connected by a digital communication bus 106, and at least one digital signal 108 is transmitted from the aircraft computer 102 to the engine computer 104. The aircraft 100 may be any type of aircraft 100 having an engine 110 therein, such as a fixed-wing aircraft, a rotary-wing aircraft, and a jet aircraft. The aircraft computer 102 may be an aircraft management controller (AMC), a flight management system (FMS), an aircraft digital computer system, or any other device used for computing inside an aircraft. The engine computer 104 may be any type of computing unit of an engine 110, such as an engine control unit (ECU), an engine electronic controller (EEC), an engine electronic control system, and a Full Authority Digital Engine Controller (FADEC). The engine computer 104 may form part of or be associated with various types of engines 110, such as turboshaft engines, turboprop engines, turbofan engines, and auxiliary power engines (also referred to as auxiliary power units (APU)). The digital communication bus 106 may be any communication system used to carry one or more individual pieces of information. The bus 106 may be dedicated to power-related data, or it may include power and other data types. The bus 106 may be composed of various hardware components, such as one or more electrical wires and/or optical fibers, and software components, and the at least one data signal 108 is transmitted using at least one communication protocol, such as but not limited to the ARINC Standards.

The aircraft computer 102 may be configured to estimate or compute a power need for the aircraft 100, referred to herein as a power request as it is a request for power from the aircraft 100 to the engine 110. The power request is sent digitally from the aircraft computer 102 to the engine computer 104 via the bus 106. However, the aircraft computer 102 and the engine computer 104 may not be operating at a same update rate. When the update rate of the aircraft computer is larger than the update rate of the engine computer, an extra and nondeterministic but bounded latency will be introduced due to digital sampling and holding function. The delay is nondeterministic due to lack of clock synchronization between the internal clocks of the two computers. The delay is bounded to the least multiple of the engine computer cycles that is greater than the aircraft computer cycle. Suppose that the aircraft cycle is $dT_{AC}$ and the engine cycle is $dT_{EC}$. The least multiple is the smallest positive integer that holds the following function:

$$n \times dT_{EC} \geq dT_{AC}$$

Figure 2:
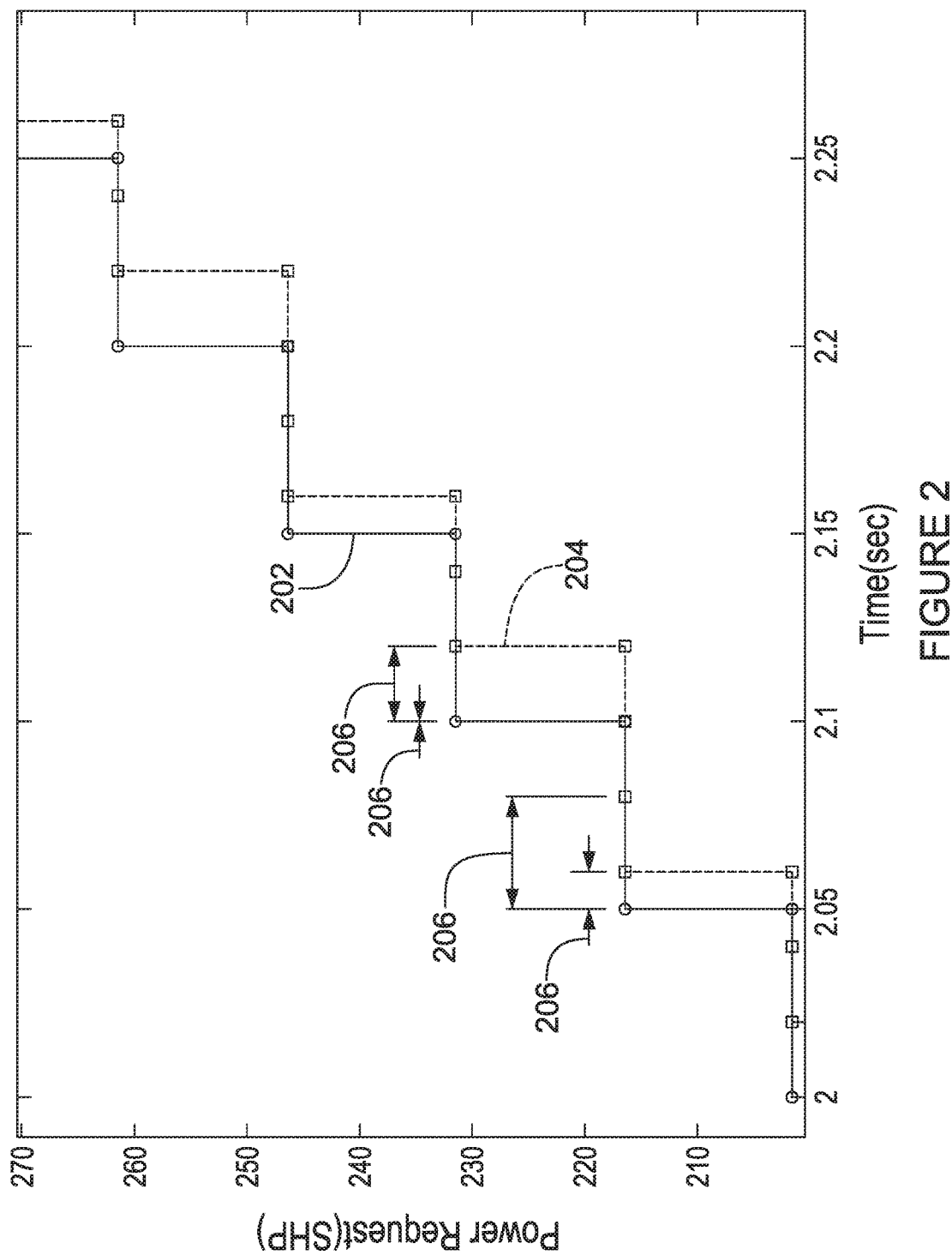
FIG. 2 is a graph illustrating a latency due to the different update rates of the aircraft computer and the engine computer, in accordance with one embodiment.

FIG. 2 illustrates this issue for one example embodiment. A first function 202 represents the update rate of the aircraft computer 102. A second function 204, represents the update rate of the engine computer 104. As shown, a nondeterministic but bounded latency 206 occurs due to the difference in update rate of the aircraft computer 102 and the engine computer 104.

Figure 3:
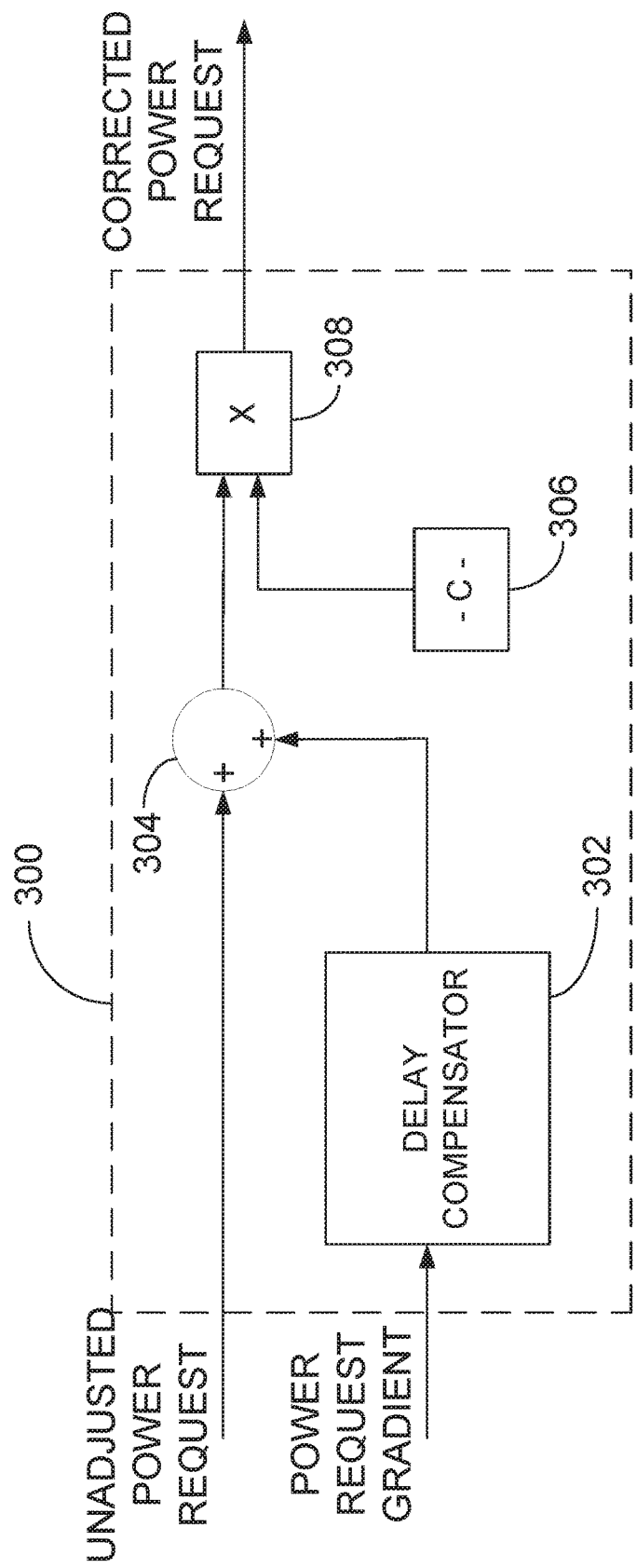
FIG. 3 is a block diagram of a power request calculator, in accordance with one embodiment.

Referring to FIG. 3, there is illustrated a power request calculator 300 for digital communication between the aircraft computer 102 and the engine computer 104. The power request calculator 300 is provided within the engine computer 104 and receives a power request signal and a gradient of the power request signal, referred to herein as a power request gradient, from the aircraft computer 102. The power request gradient should be understood to refer to the slope of the tangent of the power request. The power request is calculated by the aircraft computer 102 and sent to the engine computer 104 via the bus 106. At this stage, the power request may be referred to as an unadjusted power request as it is still in its original form. The power request gradient may be obtained by applying a derivative function to the unadjusted power request, or via any other known means to obtain a gradient. The power request gradient is determined by the aircraft computer 102 and sent to the engine computer 104 so as not to contaminate the power request gradient with the latency between the aircraft computer 102 and the engine computer 104.

A delay compensator 302 receives the power request gradient and applies a delay compensation component to the power request gradient in order to generate a delay compensated contribution. In some embodiments, the power request gradient is processed before being provided to the delay compensator 302. For example, the signal may need to be filtered before further processing. In some embodiments, this processing may be performed by the delay compensator 302. Once it is generated, the delay compensated contribution is output from the delay compensator 302 and provided to an adder 304, where it is summed with the unadjusted power request. The output of the adder 304 is an adjusted power request. The adjusted power request is provided to a multiplier 308, where it is multiplied with a compensation limiter 306. The compensation limiter 306 is used to limit the authority of the power request calculator 300, and may be a value selected between 0 and 1. The output of the multiplier 308 is the corrected power request, which may be used for calculation of a gas generator speed.

Figure 4:
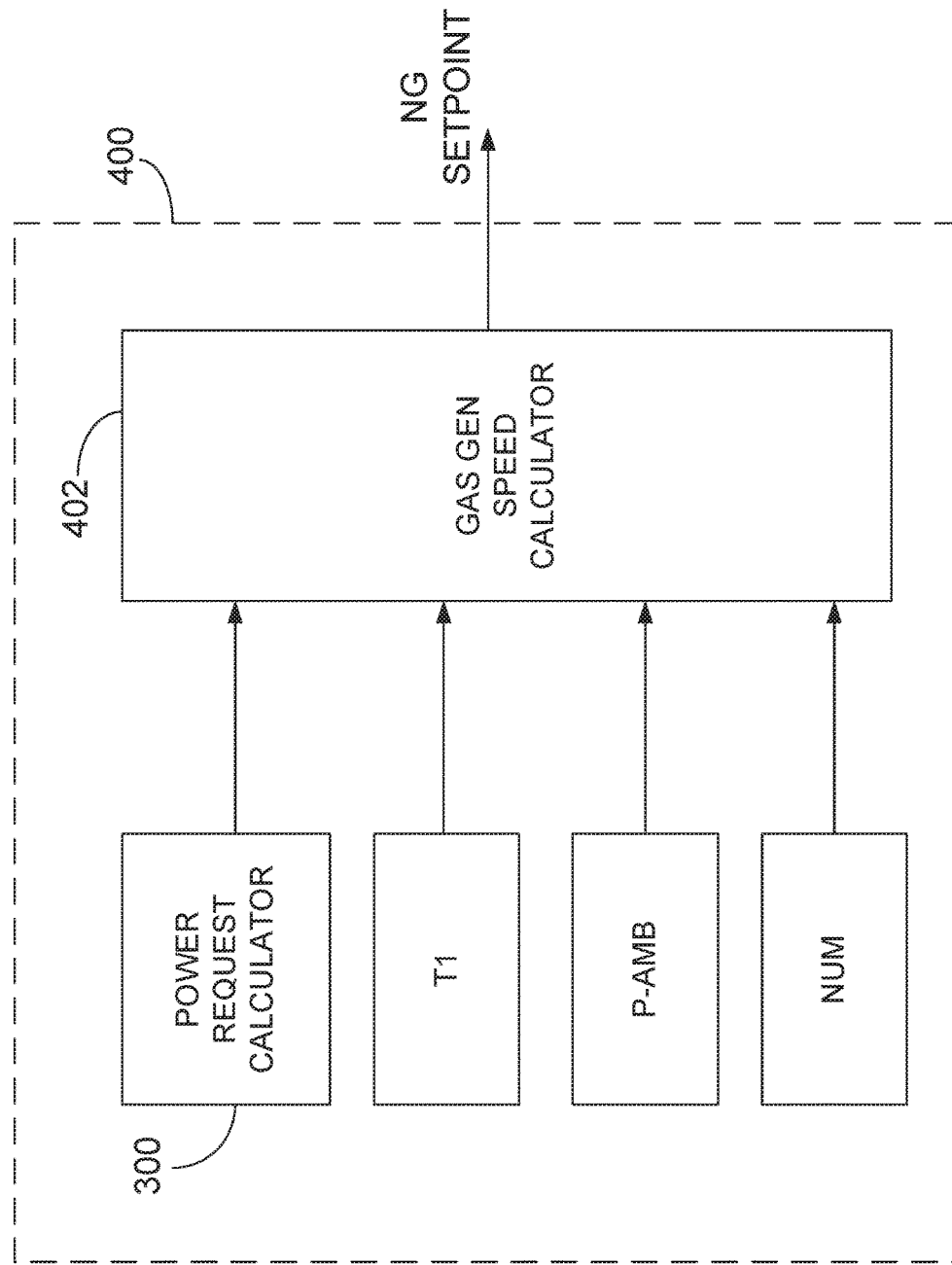
FIG. 4 is a block diagram of a feedforward controller incorporating the power request calculator, in accordance with one embodiment.

As illustrated in FIG. 4, the power request calculator 300 may form part of a feedforward controller 400 of a control system of the engine 110. A gas generator speed calculator 402 uses the corrected power request as well as other parameters, such as ambient temperature (T1), ambient pressure (P-AMB), a number of operative engines (NUM), and an engine characteristic map between the gas generator speed (Ng) and the engine power (not shown). The Ng setpoint may then be fed to the control system of the engine 110. The embodiment of FIG. 4 is one example of a feedforward controller 400 incorporating the power request calculator 300. Other embodiments may also be used.

Figure 5:
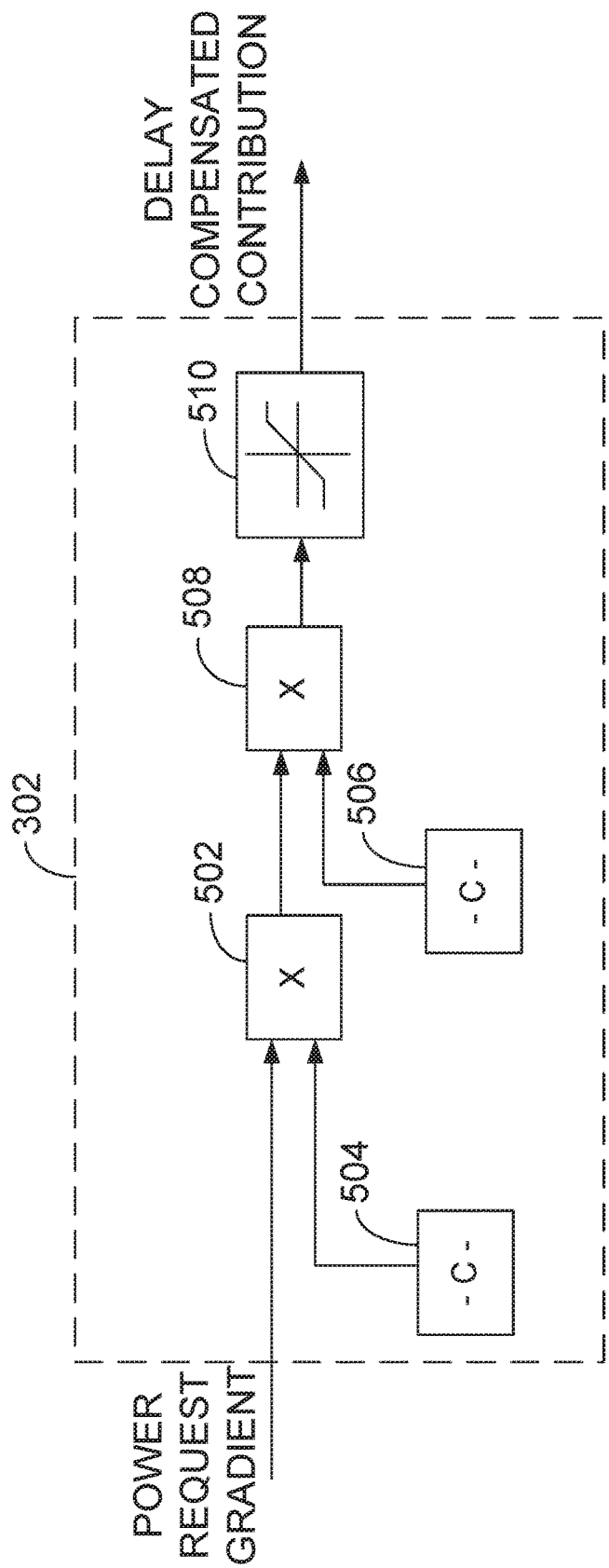
FIG. 5 is a block diagram of a delay compensator, in accordance with one embodiment.

Turning now to FIG. 5, there is illustrated one example embodiment for the delay compensator 302. The delay compensator 302 predicts the power request at time T based on the power request gradient. In some embodiments, a delay constant 504 is set to be proportional to the latency between the aircraft computer 102 and the engine computer 104. In some embodiments, the delay constant 504 is set to be any value between a maximum latency time and a minimum latency time between the aircraft computer 102 and the engine computer 104, where the minimum latency time is a best-case scenario while the maximum latency time is a worse-case scenario. If the power request calculator 300 is designed to be very aggressive in compensating the latency time, then the delay constant 504 may be set to a value higher than an average latency time. If the power request calculator 300 is designed to be more conservative in compensating latency time, then the delay constant may be set to a value lower than an average latency time. In some embodiments, the value is set to the average latency time.

In some embodiments, the product of the power request gradient and the delay constant 504 is also be provided to a another multiplier 508, where it is multiplied with a gradient authority limiter 506. The gradient authority limiter 506 serves to limit overcompensation of the latency time, and acts as an adjustment factor. It may be a value selected between 0 and 1. In some embodiments, the delay constant 504 and the gradient authority limiter 506 may be provided as a single value and a single multiplier 502 may be used to multiply the power request gradient. In some embodiments, the gradient authority limiter 506 and the second multiplier 508 are omitted.

In some embodiments, the output of the first multiplier 502 or the second multiplier 508 (when present), is clamped between an upper limit and a lower limit by a saturation device 510. This step ensures that the dominant term in the corrected power request is the unadjusted power request, not the delay compensated contribution. This may also help in cases where the delay compensated contribution signal is affected by noise or there is a failure in the power request calculator 300 or elsewhere.

In some embodiments, the power request calculator 300 may be implemented in hardware, using analog and/or digital circuit components, as illustrated in FIGS. 3 and 5. In some embodiments, the power request calculator 300 may be provided as an application-specific integrated circuit (ASIC) or a field programmable gate array (FPGA). In some embodiments, the power request calculator 300 is implemented using a combination of hardware and software components. In some embodiments, the power request calculator 300 is provided as a non-transitory computer readable medium having stored thereon program code executable by a processor for carrying out the instructions of the program code.

Figure 6:
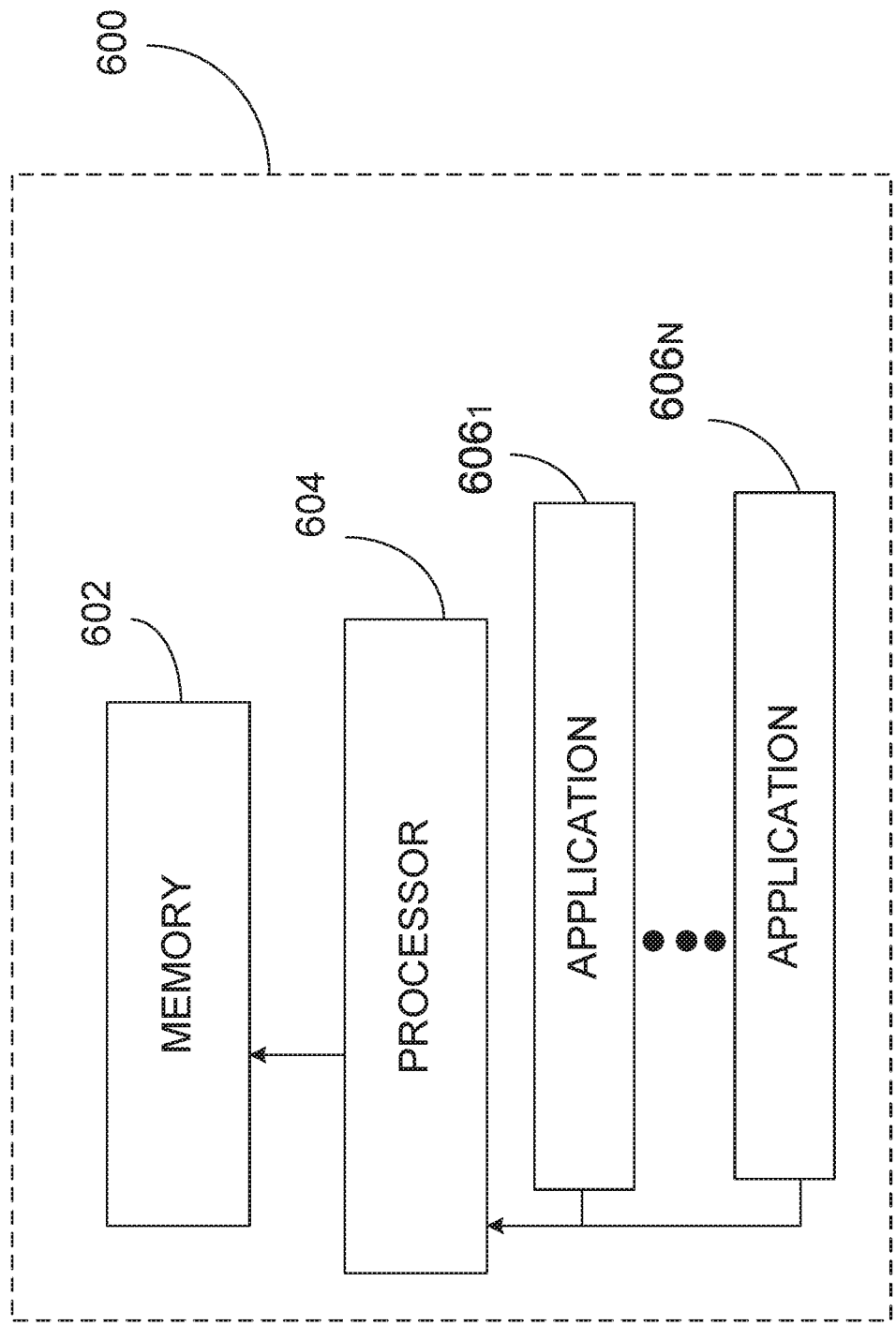
FIG. 6 is a block diagram of a computing device implementing the power request calculator, in accordance with one embodiment.

In other embodiments, the power request calculator 300 may be implemented in software, as one or more applications running on a computing device 600, as illustrated in FIG. 6. The computing device 600 illustratively comprises, amongst other things, a plurality of applications $606_1 \ldots 606_n$ running on a processor 604 coupled to a memory 602. The applications $606_1 \ldots 606_n$ are illustrated as separate entities but may be combined or separated in a variety of ways. For example, a first application may be used to implement the delay compensator 302 while a second application may be used to implement the adder 304 and the multiplier 308. Alternatively, a single application may be used to implement the delay compensator 302, the adder 304, and the multiplier 308, or multiple applications may be used to implement each one of the delay compensator 302, the adder 304, and the multiplier 308.

The memory 602 accessible by the processor 604 may receive and store data, such as the unadjusted power request, the power request gradient, the value used for the compensation limiter 306, the value used for the delay constant 504, the value used for the gradient authority limiter 506, and the upper/lower clamping limits. The memory 602 may be a main memory, such as a high speed Random Access Memory (RAM), or an auxiliary storage unit, such as a hard disk, a floppy disk, or a magnetic tape drive. The memory 602 may be any other type of memory, such as a Read-Only Memory (ROM), or optical storage media such as a videodisc and a compact disc. The processor 604 may access the memory 602 to retrieve data. The processor 604 may be any device that can perform operations on data. Examples are a central processing unit (CPU), a front-end processor, a microprocessor, and a network processor. The applications $606_1 \ldots 606_n$ are coupled to the processor 604 and configured to perform the methods as illustrated in FIGS. 7 and 8.

Figure 7:
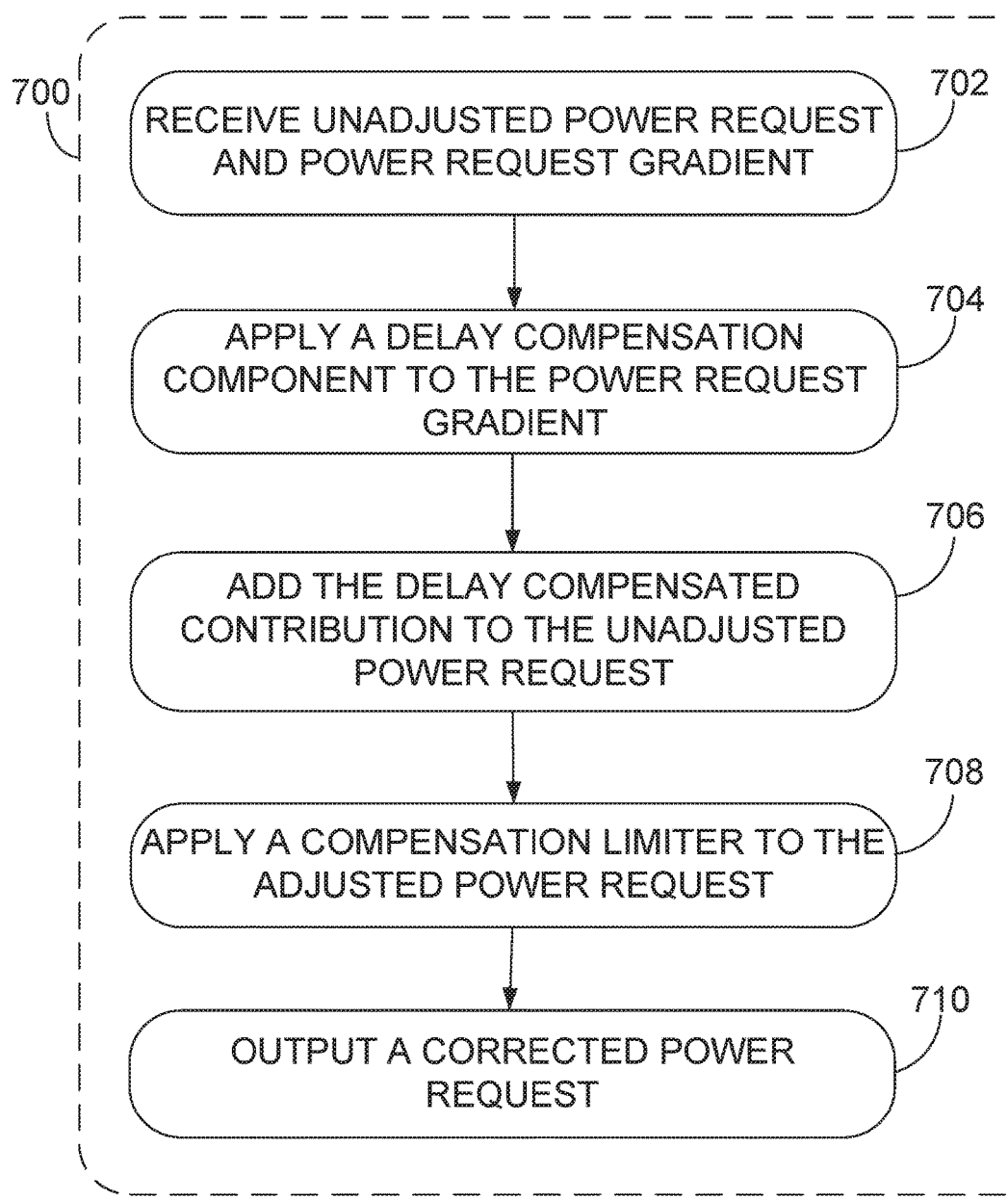
FIG. 7 is a flowchart of a method of communicating a power request between the aircraft computer and the engine computer, in accordance with one embodiment.

FIG. 7 is an example of a method 700 for communicating a power request between the aircraft computer 102 and the engine computer 104. At 702, the unadjusted power request and the power request gradient are received by the engine computer 104. At 704, the delay compensation component is applied to the power request gradient to generate the delay compensated contribution. At 706, the delay compensated contribution is added to the unadjusted power request to obtain an adjusted power request. At 708, a compensation limiter is applied to the adjusted power request to obtain the corrected power request, and at 710, the corrected power request is output.

Figure 8:
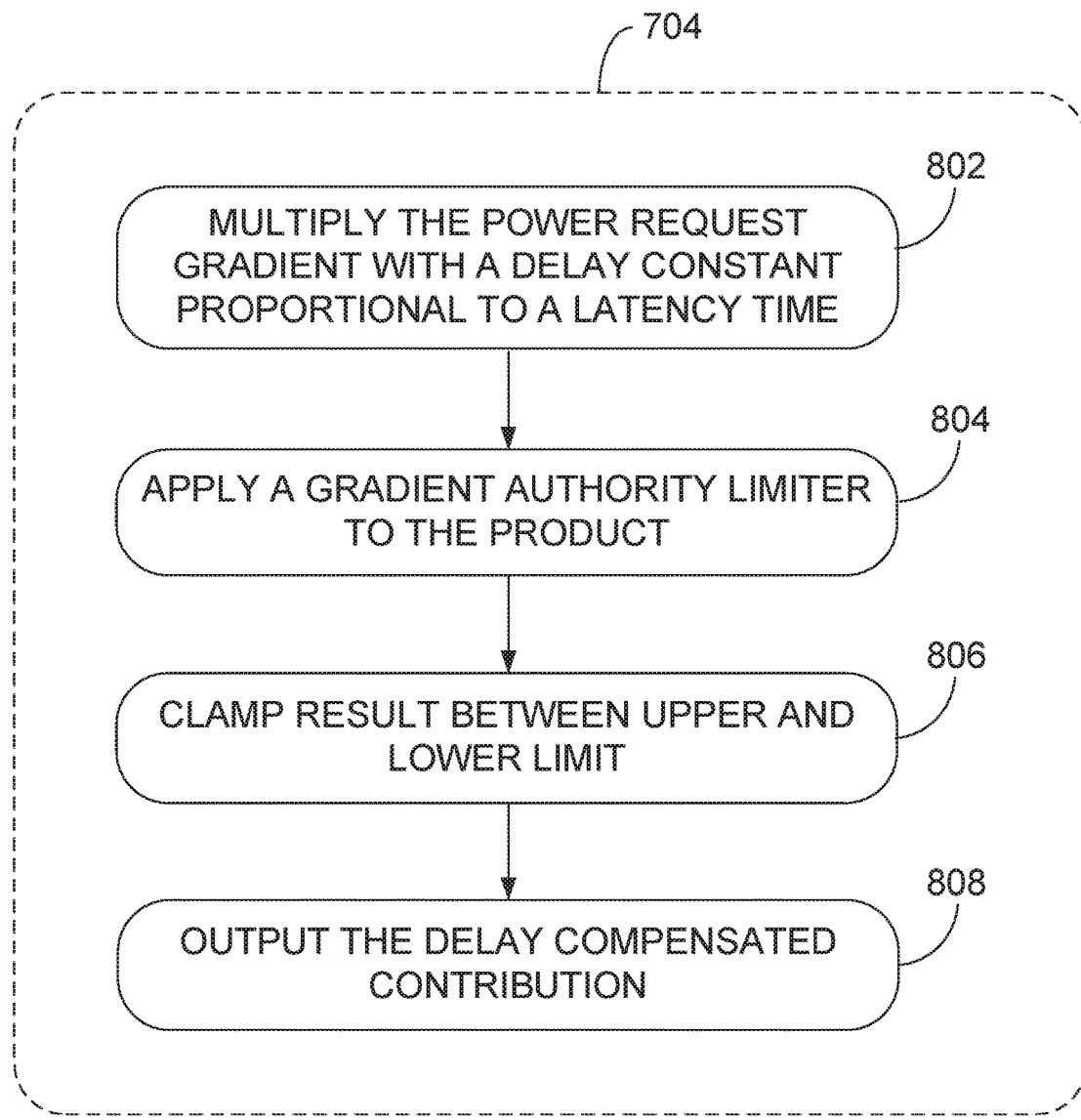
FIG. 8 is a flowchart of an example embodiment for applying a delay compensation component to the power request gradient.

FIG. 8 is an example embodiment of step 704, where the delay compensation component is applied to the power request gradient to generate the delay compensated contribution. At 802, the power request gradient is multiplied with the delay constant. At 804, the gradient authority limiter is applied to the product of the delay constant and the unadjusted power request. At 806, the result is clamped between an upper and a lower limit. At 808, the delay compensated contribution is output.

Figure 9:
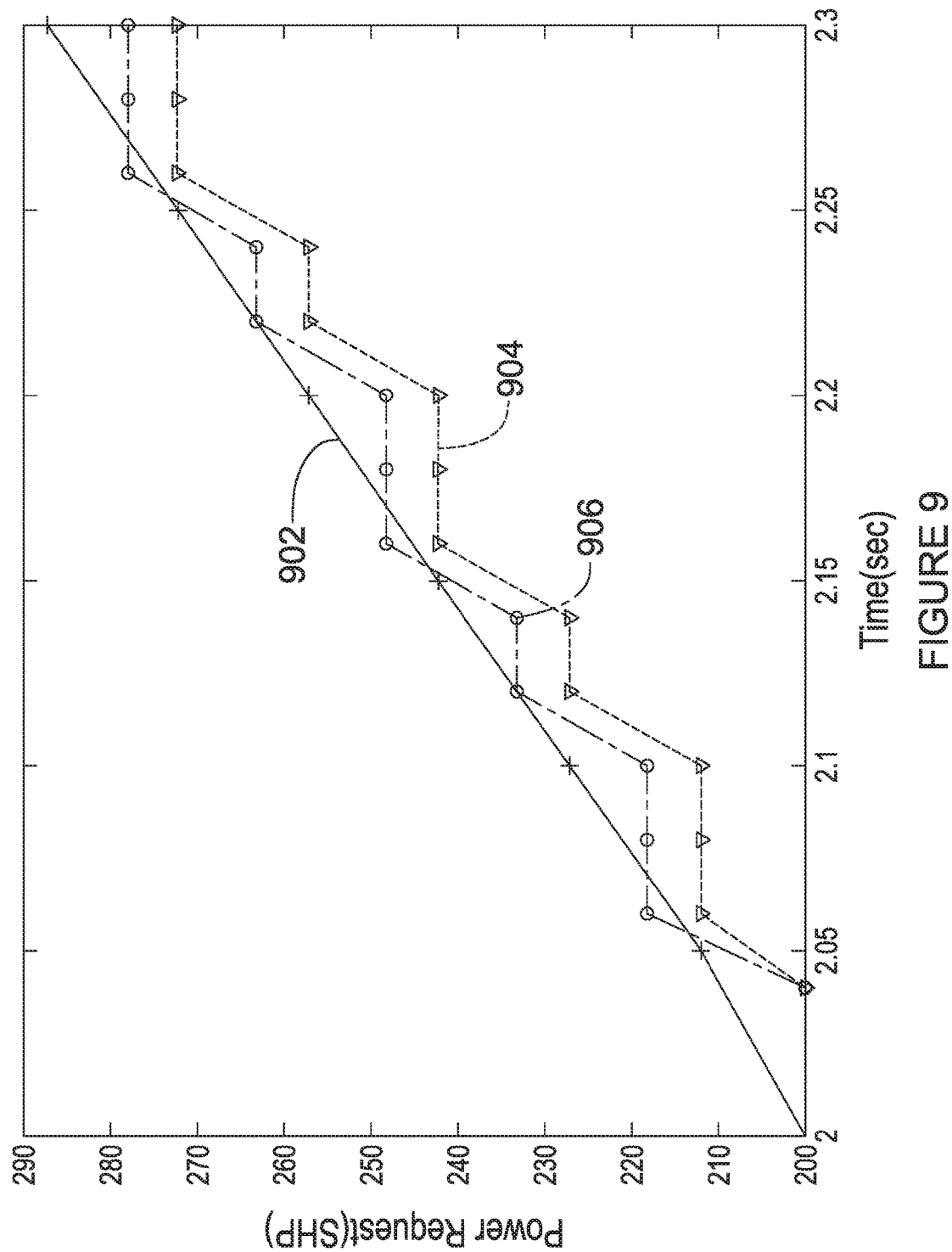
FIG. 9 is a graph illustrating an update rate of a latency compensated engine computer.

FIG. 9 is a graph illustrating an example of the use of the power request calculator 300 and method 700 described herein. The update rate of the aircraft computer 102 is illustrated at 902. The update rate of the engine computer 104 is shown at 904. The update rate of a delay compensated engine computer 104 is shown at 906.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A method of communicating a digital power request between an aircraft computer and an engine computer associated with an engine, the method comprising:
   receiving at the engine computer, from the aircraft computer, an unadjusted power request and a power request gradient;
   applying, at the engine computer, a delay compensation component to the power request gradient to generate a delay compensated contribution, the delay compensation component based on a delay constant proportional to a latency between the aircraft computer and the engine computer;
   adding, at the engine computer, the delay compensated contribution to the unadjusted power request to obtain an adjusted power request;
   applying, at the engine computer, a compensation limiter to the adjusted power request to obtain a corrected power request; and
   outputting, from the engine computer, the corrected power request to control operation of the engine.

2. The method of claim 1, wherein applying a delay compensation component to the power request gradient comprises multiplying the power request gradient by the delay constant, wherein the delay constant being proportional to the latency between the aircraft computer and the engine computer comprises being proportional to a second latency between an update rate of the aircraft computer and an update rate of the engine computer, to obtain a first product, and wherein the delay compensated contribution is based on the first product.

3. The method of claim 2, wherein the delay constant corresponds to a value between a minimum latency and a maximum latency between the update rate of the aircraft computer and the update rate of the engine computer.

4. The method of claim 3, wherein the value is an average of the minimum latency and the maximum latency.

5. The method of claim 3, wherein the value is between the minimum latency and an average of the minimum latency and the maximum latency.

6. The method of claim 3, wherein applying a delay compensation component to the power request gradient further comprises multiplying the first product with a gradient authority limiter to obtain a second product.

7. The method of claim 6, wherein the gradient authority limiter corresponds to a value between 0 and 1.

8. The method of claim 7, wherein applying a delay compensation component to the power request gradient further comprises clamping the second product between an upper limit and a lower limit.

9. The method of claim 1, further comprising processing the power request gradient, at the engine computer, before applying the delay compensation component thereto.

10. A system for communicating a digital power request between an aircraft computer and an engine computer associated with an engine, the system comprising:
at least one of:
(a) (i) a memory having stored thereon program code executable by a processor; and
(ii) at least one processor configured for executing the program code; and
(b) a circuit;
the at least one of (a) and (b) configured for:
receiving, at the engine computer, from the aircraft computer, an unadjusted power request and a power request gradient;
applying, by the at least one of (a) and (b), a delay compensation component to the power request gradient to generate a delay compensated contribution, the delay compensation component based on a delay constant proportional to a latency between the aircraft computer and the engine computer;
adding, by the at least one of (a) and (b), the delay compensated contribution to the unadjusted power request to obtain an adjusted power request;
applying, by the at least one of (a) and (b), a compensation limiter to the adjusted power request to obtain a corrected power request; and
outputting, from the at least one of (a) and (b), the corrected power request to control operation of the engine.

11. The system of claim 10, wherein applying a delay compensation component to the power request gradient comprises multiplying the power request gradient by the delay constant, wherein the delay constant being proportional to the latency between the aircraft computer and the engine computer comprises being proportional to a second latency between an update rate of the aircraft computer and an update rate of the engine computer, to obtain a first product, and wherein the delay compensated contribution is based on the first product.

12. The system of claim 11, wherein the delay constant corresponds to a value between a minimum latency and a maximum latency between the update rate of the aircraft computer and the update rate of the engine computer.

13. The system of claim 12, wherein the value is an average of the minimum latency and the maximum latency.

14. The system of claim 12, wherein the value is between the minimum latency and an average of the minimum latency and the maximum latency.

15. The system of claim 12, wherein applying a delay compensation component to the power request gradient further comprises multiplying the first product with a gradient authority limiter to obtain a second product.

16. The system of claim 15, wherein the gradient authority limiter corresponds to a value between 0 and 1.

17. The system of claim 16, wherein applying a delay compensation component to the power request gradient further comprises clamping the second product between an upper limit and a lower limit.

18. The system of claim 10, further comprising processing the power request gradient, at the engine computer, before applying the delay compensation component thereto.

19. A power request calculator comprising:
means for receiving at an engine computer, from an aircraft computer, an unadjusted power request and a power request gradient, wherein the engine computer is associated with an engine;
means for applying, at the engine computer, a delay compensation component to the power request gradient to generate a delay compensated contribution, the delay compensation component based on a delay constant proportional to a latency between the aircraft computer and the engine computer;
means for adding, at the engine computer, the delay compensated contribution to the unadjusted power request to obtain an adjusted power request;
means for applying, at the engine computer, a compensation limiter to the adjusted power request to obtain a corrected power request; and
means for outputting, from the engine computer, the corrected power request to control operation of the engine.

* * * * *